UNITED STATES PATENT OFFICE.

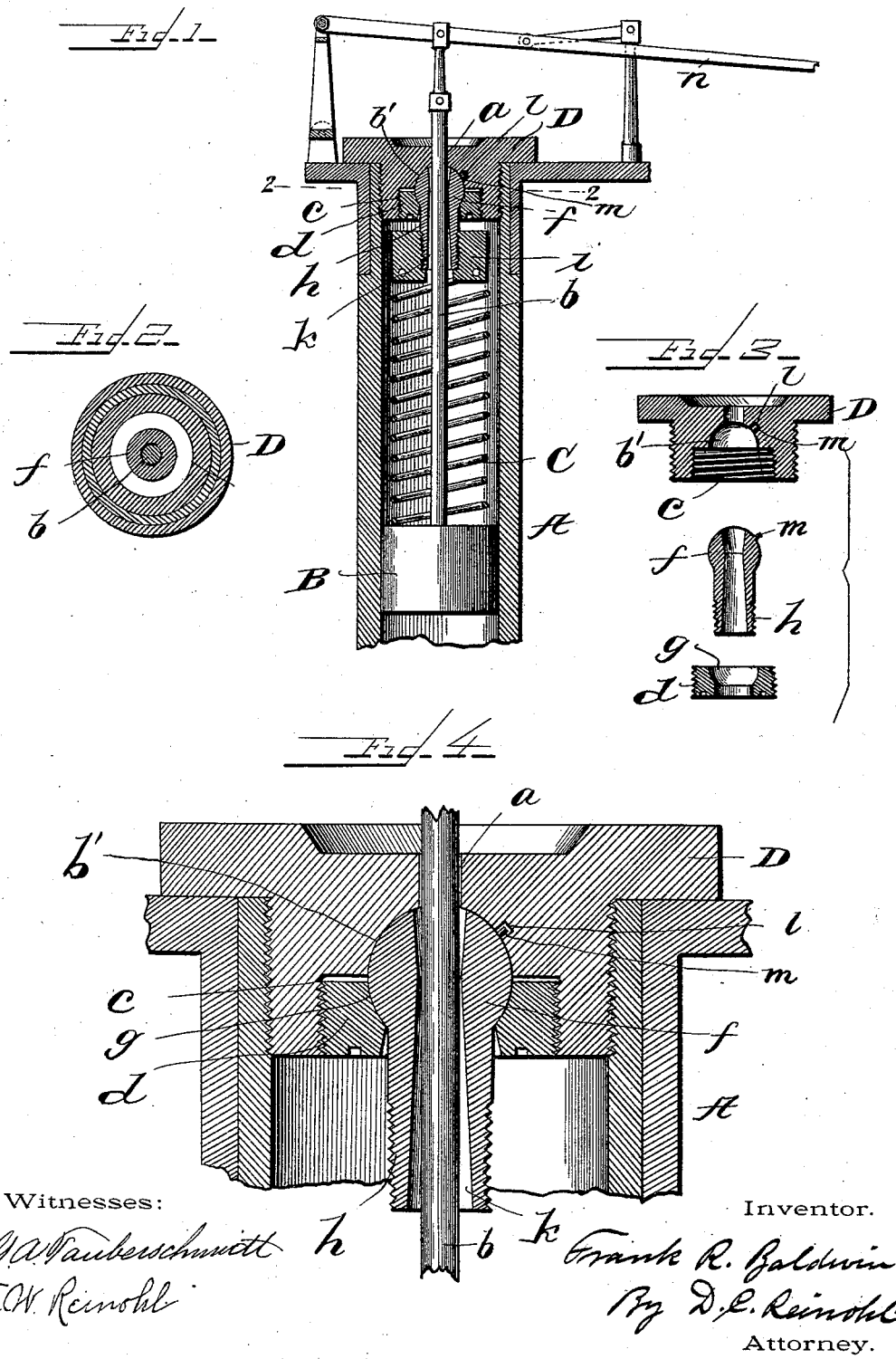

FRANK R. BALDWIN, OF JERSEY CITY, NEW JERSEY.

STEAM-ENGINE INDICATOR-CYLINDER.

SPECIFICATION forming part of Letters Patent No. 536,255, dated March 26, 1895.

Application filed November 6, 1894. Serial No. 528,079. (No model.)

*To all whom it may concern:*

Be it known that I, FRANK R. BALDWIN, a citizen of the United States, residing at Jersey City, in the county of Hudson and State of New Jersey, have invented certain new and useful Improvements in Indicator-Cylinders; and I do hereby declare the following to be a full, clear, and exact description of the invention, such as will enable others skilled in the art to which it appertains to make and use the same.

My present invention relates to indicators such as are used to indicate steam, gas, or fluid engines and for analogous purposes, and has for its object certain improvements in the construction of the cylinder of such instruments whereby the accuracy or precision of their operation is increased by reducing the friction of the working parts in the cylinder to the minimum.

As heretofore constructed the piston, or the spring which weights the piston, or both the piston and the spring are thrown out of alignment in the cylinder when the pressure of the steam, gas, or fluid is admitted thereto and the spring buckled or pushed off to one side which causes the piston to bear against the wall of the cylinder sufficient to produce undue friction; also as previously constructed the spring is screwed rigidly to the cylinder-head, and it is practically impossible to connect the wire of which the spring is composed to the nut or head of the spring in a manner that it will not when screwed rigidly to the cylinder head throw the piston and its rod to one side of the cylinder. A small amount out of alignment where connected to the cylinder head is greatly multiplied at the piston. Therefore the friction due to a minutely imperfect alignment at the cylinder head will cause undue friction of piston and impair the usefulness of the instrument. It is also a fact that after being used in practical operation the spring seldom ever remains in the same condition relative to its connection with the nut or head.

The value of this class of instruments depends upon the nearest approach to absolute accuracy of indicating the initial pressure, point of cut off, and the expansion and pressure at all points in the stroke of the piston of the engine; hence the importance of avoiding anything that will disturb the perfect alignment of the piston or otherwise produce friction by contact with the inner wall of the indicator cylinder.

With this object in view the invention will be fully disclosed in the following specification and claims.

In the accompanying drawings which form part of this specification Figure 1 represents a vertical section of an indicator-cylinder with the lower portion broken away and the piston and its rod, the pencil bar and its support shown in side elevation; Fig. 2, an inverted plan view on the line 2—2 Fig. 1; Fig. 3, a vertical section of the cylinder head and the parts constituting the ball and socket joint therein detached, and Fig. 4, a vertical section on an enlarged scale, showing the upper part of the cylinder and its head, and the piston rod in side elevation.

Reference being had to the drawings and the letters thereon, A indicates the cylinder; B, the piston; C, the spring, all of which may be of any preferred form and constitute no part of my invention.

D indicates the cylinder-head which is provided with a central aperture or passage $a$ for the piston rod $b$, a semispherical seat $b'$, a recess $c$ for the nut $d$, and a ball $f$. The nut $d$ is provided with a concave seat $g$ which in conjunction with the seat $b'$ and the ball $f$ constitute a ball and socket joint. The ball is provided with an extension $h$ to which the spring C is shown attached by a nut $i$ see Fig. 1 and through the ball $f$ and the extension $h$ is a passage $k$ for the piston rod $a$ which passage may be tapered in both directions to prevent the piston rod coming in contact therewith and producing friction, or it may be a parallel bore of sufficient diameter to avoid the same result. The cylinder-head D is also provided with a rabbet $l$ to receive a stud $m$ see Fig. 4 projecting from the ball $f$ which prevents the turning of the ball on its axis when the nut $i$ connected to the spring C is screwed on the extension $h$.

The cylinder-head D is designed to be made to conform to the cylinders of standard indicators, and my invention applied thereto by simply substituting this head for the ordinary heads now in use in such indicator-cylinders.

To the outer end of the piston rod $b$ is attached the pencil bar n of any approved indicator mechanism.

In the operation of the piston B, should there be any irregularity in the tension of the spring C that would cause the spring to contract irregularly, the ball and socket joint in the cylinder-head will admit of the spring adjusting itself without throwing the piston in the cylinder out of its perfect alignment, or crowding the piston-rod against the wall of the passage a through the cylinder head.

The piston and rod remaining in perfect alignment and perfectly free, regardless of any inequalities or binding action of the spring or connections, reduces friction to a minimum, thereby increasing the effectiveness and usefulness of the instrument.

Having thus fully described my invention, what I claim is—

1. An indicator cylinder-head having a seat for a ball-joint therein, a ball having an inwardly projecting neck or extension a spring suspended from said neck and a passage through the ball and its extension in combination with the rod of the cylinder-piston.

2. An indicator cylinder having a ball joint in the head thereof and provided with a passage through the ball, a piston provided with a rod which passes freely through the ball a pencil-bar to which said rod is connected, and a spring between the cylinder-head and the piston.

3. An indicator cylinder-head having a semi-ball-joint seat formed therein a ball provided with an extension, a removable semi-ball joint seat in said head and securing the ball in its seat, a passage through the ball and its extension, a piston having a rod extending through the ball of the joint and connected to the pencil-rod, and a suitable spring.

4. An indicator cylinder having a seat for a ball-joint in the head thereof, a ball for said joint having an extension on one side thereof and an oppositely tapered passage through said ball and extension, a piston provided with a rod extending through the ball of said joint and a suitable spring.

5. An indicator-cylinder head having a seat for a ball-joint therein, a ball having a passage there through, a spring connected to the ball, means for preventing rotation of said ball in its seat and a piston rod.

In testimony whereof I affix my signature in presence of two witnesses.

FRANK R. BALDWIN.

Witnesses:
WILLIAM F. CLARE,
D. C. REINOHL.